INTEGRATED CIRCUIT CARRIER

Filed Sept. 28, 1967 2 Sheets-Sheet 1

INVENTORS
JAMES W. BARNES
LANE K. JARVIS

BY Seidel & Gonda

ATTORNEYS.

Nov. 5, 1968 J. W. BARNES ETAL 3,409,861

INTEGRATED CIRCUIT CARRIER

Filed Sept. 28, 1967 2 Sheets-Sheet 2

INVENTORS.
JAMES W. BARNES
LANE K. JARVIS
BY Seidel & Gonda
ATTORNEYS.

United States Patent Office 3,409,861

Patented Nov. 5, 1968

3,409,861

INTEGRATED CIRCUIT CARRIER

James W. Barnes, Drexel Hill, and Lane K. Jarvis, Lansdowne, Pa., assignors to Barnes Corporation, a corporation of Pennsylvania Filed Sept. 28, 1967, Ser. No. 671,322

12 Claims. (Cl. 339—174)

ABSTRACT OF THE DISCLOSURE

A one-piece carrier for a flat pack integrated circuit having integral resilient, stepped retention clips. Retention clips are positioned to expose one entire surface of flat pack integrated circuit.

*Disclosure*

This invention relates to an integrated circuit carrier. More particularly, this invention relates to a carrier for a flat pack integrated circuit which permits one entire side of the integrated circuit to be exposed.

Mainly because of their size, integrated circuits require special handling techniques. Directly related to the handling techniques is the necessity for providing carriers which retain and protect the integrated circuit packages. These carriers provide a means by which the integrated circuits can be handled and manipulated for marking, testing, including environmental testing, final packaging, user testing, and connection of the package to circuit boards or the like. The carriers have a dual function. Their first function is to retain the integrated circuit. Their second function, which is related to the first function, is to retain the integrated circuit in a manner that permits them to be operated on by testing and marking apparatus or the like as well as to provide means for manipulating them during the handling steps.

Previously known carriers for flat pack integrated circuits usually include two interlocking pieces designed to retain the flat pack integrated circuit between them. One known type of carrier includes a base having a plurality of aligned, adjacent grooves to receive the leads protruding from the integrated circuit body. The second piece fits over the integrated circuit body and interlocks with the base to thereby retain it in position. There are several distinct disadvantages to this type of flat pack carrier. Since it is made of two pieces, it requires additional handling steps to lock the integrated circuit in position. Moreover, the interlocking piece of necessity overlies a large portion of the integrated circuit chip, if not all of it, precisely when it is desirable to have it exposed. If the integrated circuit can be fully exposed, then certain additional operating steps can be combined with the testing step. For example, the marking step can be done simultaneously with the manufacturers testing of the integrated circuit.

It therefore is an object of the present invention to provide an integrated circuit carrier which will retain the integrated circuit while leaving exposed an entire surface of the integrated circuit body and its leads.

Other objects will appear hereinafter.

For the purpose of illustrating the invention, there is shown in the drawings a form which is presently preferred; it being understood, however, that this invention is not limited to the precise arrangements and instrumentalities shown.

Figures 1, 2, 3, 4:
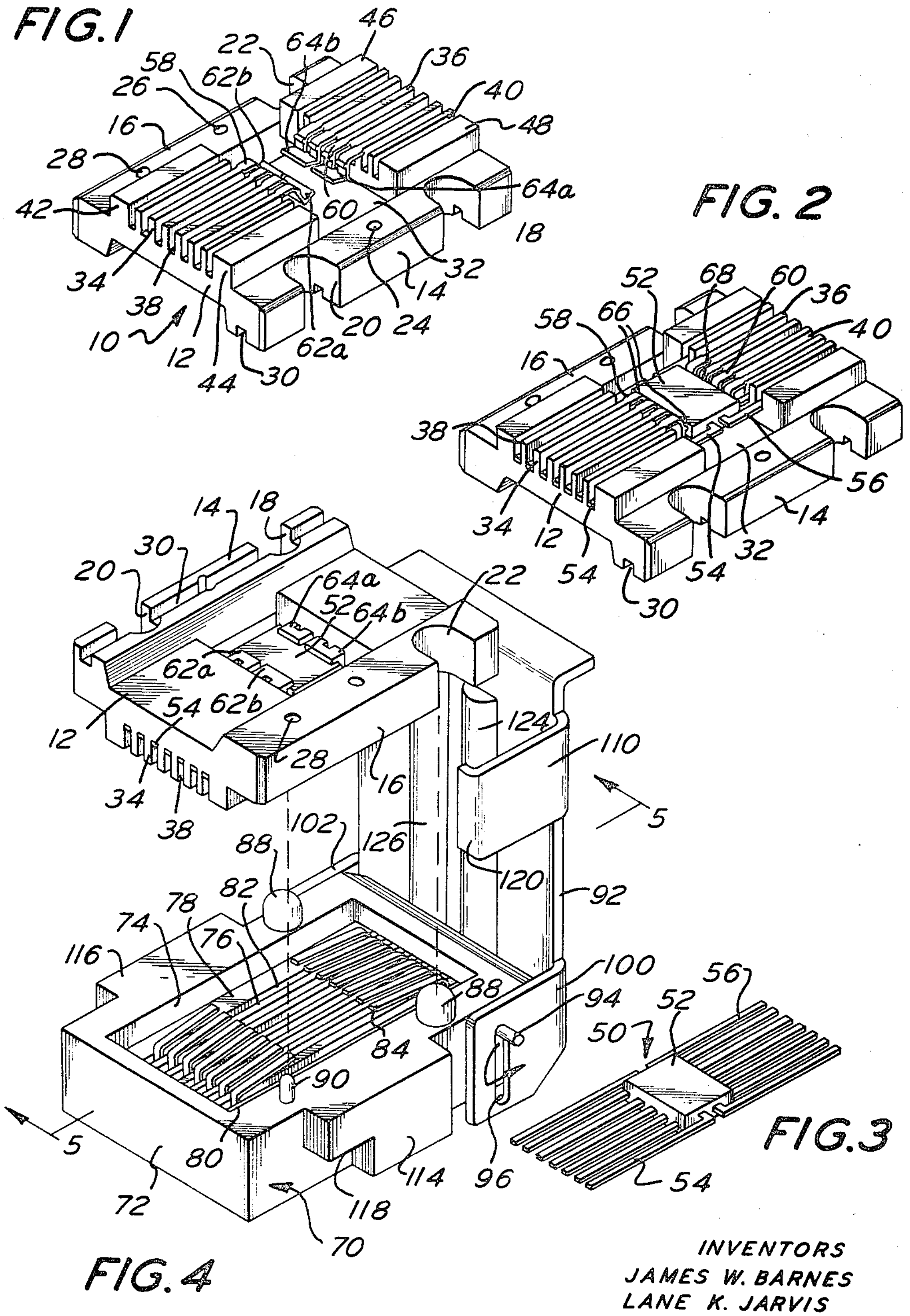
FIGURE 1 is a perspective view of the integrated circuit carrier in accordance with the present invention.
FIG. 2 is a perspective view of the integrated circuit carrier in accordance with the present invention showing a flat pack integrated circuit retained therein.
FIGURE 3 is a perspective view of a flat pack integrated circuit.
FIGURE 4 is an exploded perspective view of a test socket which may be used with the integrated circuit carrier of the present invention.

Referring now in detail to the drawings, wherein like numerals indicate like elements, there is shown in FIGURES 1 and 2, a flat pack integrated circuit carrier designated generally as 10.

Figure 5:
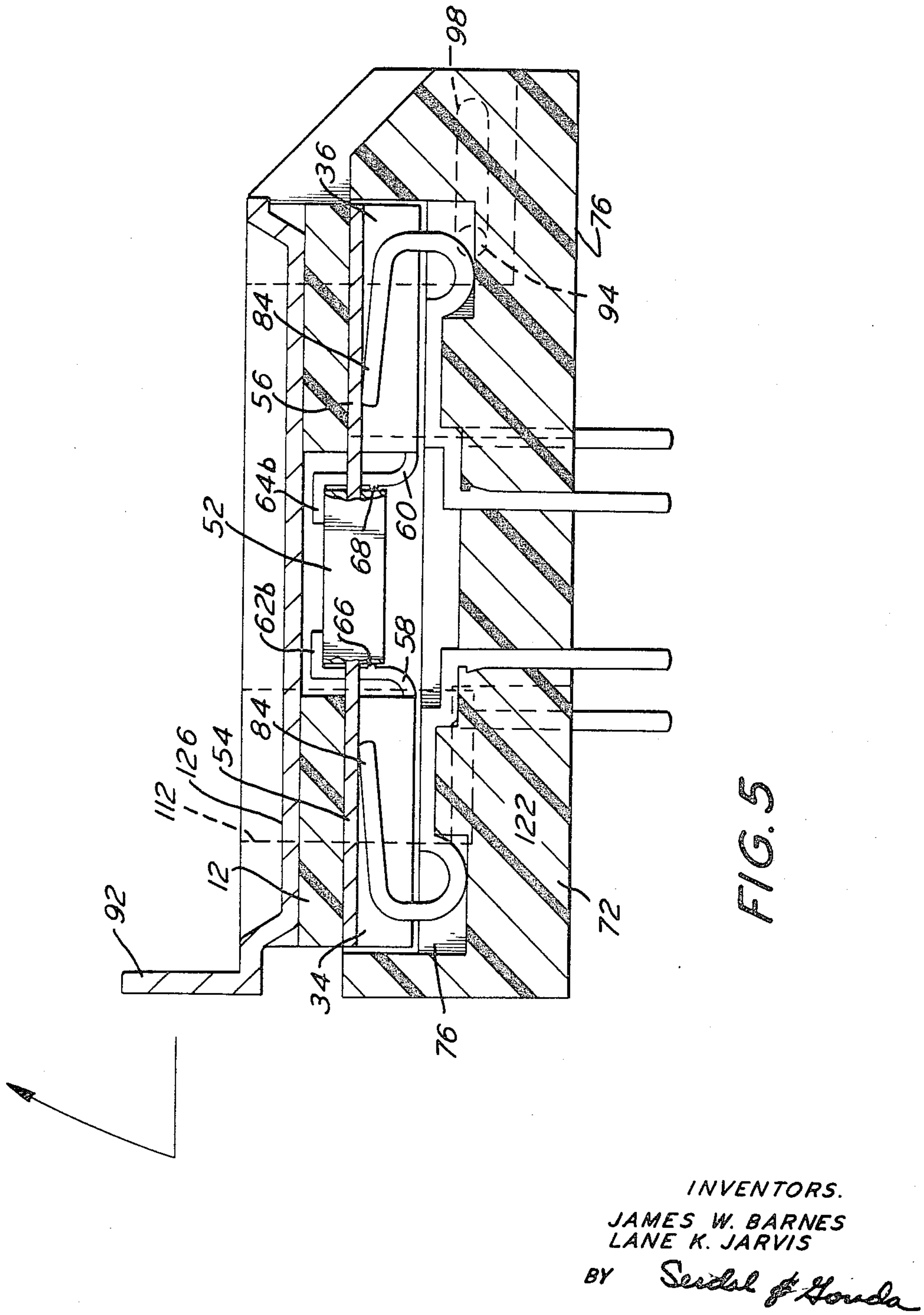
FIGURE 5 is a longitudinal sectional view of the socket illustrated in FIGURE 4 taken along the line 5—5 and showing the carrier of FIGURE 2 positioned there.

The carrier 10 consists of a rectangular integral structure comprising a base 12 and integral flanges 14 and 16. The flanges 14 and 16 provide the means whereby the carrier 10 can be manipulated either manually or automatically. In this regard, the flanges are provided with two polarization notches 18 and 20 in the flange 14 and a third polarization notch 22 in the flange 16. The notches 18, 20 and 22 are generally U-shaped to cooperate with circular indexing poles as best illustrated in FIGURE 5. However, those skilled in the art will readily recognize that there is no limitation on their shape. Moreover, the function of the polarizing notches to correctly index the carrier for cooperation with mechanical handling equipment is well known. Accordingly, it need not be described in detail, although one method of correctly indexing the carrier is illustrated in FIGURE 4. The holes 24, 26 and 28, as well as the slot 30, also cooperate with handling equipment in a well known manner. The position, number and type of notches, holes and slots provided in the carrier is basically a matter of requirements necessary to make the carrier suitable for fully mechanized loading, feeding, sorting, marking, testing and classification, all of which is well known in the art.

The base 12 is completely open in its middle where indicated by the numeral 32. At either side of the opening are a plurality of upstanding, equally spaced, longitudinally aligned walls 34 and 36 which are integral with the base 12. The walls 34 are on one side of the opening 32 and the walls 36 are on the opposite side but otherwise they are identical in structure and aligned with each other. The walls 34 and 36 define aligned, elongated grooves 38 and 40 between them. The spacing between the individual walls 34 and 36 to define the grooves 38 and 40 is sufficient to permit the leads extending from a flat pack integrated circuit to rest down in them. Preferably, the width of each individual groove 38 and 40 is only slightly more than the width of the leads extending from the integrated circuit. In the embodiment shown, the outermost walls 42, 44, 46 and 48 adjacent the flanges 14 and 16 are wider than the remaining walls 34 and 36. This provides some reinforcement and protection for the relatively thin inner walls.

By way of example but not limitation, the carrier thus far described could have the following dimensions. Those skilled in the art will recognize that the dimensions can be varied in accordance with the type of integrated circuit to be supported. By way of example, the overall lengh of the carrier 10 may be 1 inch and its overall width 0.75 inch. The length of the opening 32 may be 0.35 inch and its width 0.476 inch. The height of the flanges 14 and 16 may be 0.130 inch and the height of the walls 34, 36 and 40–48 above the base 12 may be 0.055 inch. Preferably, the grooves 38 and 40 are slightly V-shaped with the width at the base 12 being 0.027 inch and the width of the top approximately 0.032 inch. There are six walls 34 and six walls 36 which combine with the walls 42, 44 and 46, 48, respectively, to define seven grooves on each side of the opening 32 for receiving fourteen leads. The polarization notches 18, 20 and 22 may be 0.126 inch wide and the holes 24, 26 and 28 0.050 inch in diameter. The slot 30 in flange 14 may be 0.035 inch wide and 0.035 inch in height.

As indicated previously, to be effective each carrier must include a means for retaining the integrated circuit in position. Normally this is some form of clip which cooperates with the base 12 by engaging it in the hole 32 after the integrated circuit has been fitted into the grooves 38 and 40.

A typical flat pack integrated circuit 50 is shown in FIGURE 3 as including an integrated circuit body 52 having seven leads 54 projecting therefrom in one direction and seven leads 56 projecting in the opposite direction. In accordance with the present invention, the integrated circuit 50 is retained within the carrier 10 by resilient engaging means which include four fingers 58 which project into the opening 32 from each of the middle four walls 34 and four fingers 60 which project into the opening 32 from the top of each of the middle four walls 36. As best shown in FIGURE 5, each of the fingers 58 and 60 projects from their respective walls 34 and 36 outwardly toward the center of the opening 32 and then at an angle toward the base 12. The fingers 58 and 60 are each joined at their distal ends to the plates **62*a* and 62*b* and 64*a* and 64*b* which extend at right angles to the fingers toward the center of opening 32. Two adjacent fingers support each of the plates. Each of the fingers 58 and 60 also includes a small nib 66 and 68 which projects outwardly from the fingers 58 and 60 toward the center of the opening 32** from a position on the fingers at the point just below the terminus of the curvature of the fingers. The fingers together with their respective plates form a step like resilient retention means for an integrated circuit.

The fingers 58 and 60 are integral with the walls 34 and 36, and in a like manner the plates **62*a*, 62*b*, 64*a* and 64*b* are integral with the fingers 58 and 60 as are the nibs 66 and 68. As best shown in FIGURE 1, the fingers 58 and 60 normally project at an angle away from their respective walls and toward the base 12. Accordingly, the plates 62*a*, 62*b*, 64*a* and 64*b* project at an acute angle with respect to the side walls of the opening 32 which include the walls 34 and 36**.

The entire carrier 10 is made of a thermoplastic material. In the preferred embodiment, the plastic may be polysulfone. If desired, a thermosetting material could be used if the conditions of testing and the like permit. In manufacturing the carrier of the present invention, the plastic chosen must have a certain amount of resilience so that the fingers 58 and 60 will provide a spring-like biasing action. Polysulfone is capable of performing this function.

The distance between the adjacent surfaces of the nibs 66 and 68 and the adjacent surfaces of the plates **62*a*, 62*b*, 64*a* and 64*b* depends upon the thickness of the integrated circuit body to be retained. This is better understood by reference to FIGURES 2 and 5 where the flat pack integrated circuit 50 is shown in position on the carrier 10. As shown, the integrated circuit 50 has been set down into the opening 32 so that its leads 54 and 56 rest in the grooves 38 and 40. By applying a slight force to the body 52, it overrides the nibs 66 and 68 and moves down into the opening 32 until its surface rests on the plates 62*a*, 62*b*, 64*a* and 64*b*. The movement of the body 52 into the opening 32 also forces part of fingers 58 and 60 against their resilient bias until they arrive at a position which is substantially parallel to the walls of opening 32. At this point, the nibs 66 and 68 bear against the sides of integrated circuit body 52. The combination of the nibs 66 and 68 on the sides, the plates 62*a*, 62*b*, 64*a* and 64*b* on another side and the resilient biasing force of the fingers 58 and 60 will retain the integrated circuit body 52, and hence the entire integrated circuit package in the carrier 10**.

Preferably, the plates **62, 62*b*, 64*a* and 64*b* are positioned relative to the bottom of grooves 38 and 40 by an amount which is equal to the distance from the surface of the leads 54 and 56 which abuts the bottom to the surface of the body 52 which abuts the plates 62*a*, 62*b*, 64*a* and 64*b***.

By way of example, the fingers 58 and 60 may be 0.022 inch thick and the plates **62*a*, 62*b*, 64*a* and 64*b* 0.018 inch thick and 0.035 inch wide. The length of the plates is equal to the overall length between two fingers which is 0.06 inch in the example described. The nibs 66 and 68 may project from the fingers 58 and 60 by an amount equal to 0.005 inch. In the exemplary carrier described herein, the distance between the fingers 58 and 60 in their normal position is 0.250 inch and the angle between the plates 62 and 64** and the horizontal is approximately 10°. The dimensions described herein will accept a nominal ¼ inch by ¼ inch by 1/16 inch integrated circuit body.

FIGURE 2 shows the flat pack integrated circuit 50 retained in the carrier 10. The entire package is exposed as thus positioned and retained. The flat pack integrated circuit 50 is completely exposed for all types of operations which may be performed on it including electrical testing and imprinting directly on the surface of body 52. Moreover, since the integrated circuit package 50 lies well down within the opening 32 it is protected on all sides, and in particular, its leads 54 and 56 are well protected within the grooves 38 and 40.

There are many uses to which the carrier 10 with the integrated circuit 50 mounted therein may be put to use. For example, it may be installed in the socket 70 which in turn may be inserted in a test fixture to provide electrical connection for testing the integrated circuit. The socket 70, per se, forms no part of the present invention and is disclosed only as an example of one use for the integrated circuit carrier. The socket 70 is described briefly below. As shown, the socket 70 includes a rectangular box-like base 72 with a rectangular opening 74. Six spaced apart walls 76 extend across the length of opening 74 and together with the outer walls 78 and 80, define seven grooves 82 in which the resilient contacts 84 are fixed.

As best shown in FIGURE 5, the resilient contacts 84 are continuous pieces which are fixed in and project from the base 72. The contacts 84 depend along the bottom of the grooves 82 as defined by the walls 76 and the base 72 and then define a loop and extend upwardly at an angle so that in the normal position they are well above the top of walls 76, 78 and 80. The width and spacing of contacts 84 and grooves 82 is the same as that of contacts 54 and 56 on the integrated circuit 50. Thus the contacts 84 can be mated with and brought into engagement with the leads 54 and 56.

The length of opening 74 is the same as that of carrier 10. The width of opening 74 is equal to the overall distance between the walls 42 and 44 and the walls 46 and 48. Thus, the carrier 10 can be fitted into the opening 74 until the flanges 14 and 16 come to rest on the top surface of the base 72. The alignment of the carrier 10 is determined by the cooperation between notches 18 and 22 and the indexing poles 86 and 88 as well as cooperation between hole 28 and post 90.

The carrier 10 together with the flat pack integrated circuit 50 is shown mounted within the socket 70 in FIGURE 5. As thus positioned, the contacts 84 abut the leads 54 and 56 and hence make electrical connection between them and the test circuit to which the socket may be applied. The carrier 10 is held in the socket 70 against the resilient bias of the contacts 84 by the pivotable closure 92. Closure 92 is pivotally connected to the base 72 by a pair of projecting pins 94 which extend outwardly from base 72 through slots 96 and 98 in legs 100 and 102 which depend from the closure 92.

The closure 92 is held closed by cooperation between a second pair of legs 110 and 112 which depend therefrom at a point well forward of the legs 100 and 102. Legs 110 and 112 cooperate with projections 114 and 116 which extend from the base 72 and each include a notched-out portion to define a shoulder 118. The shoulders 118 on projections 114 and 116 cooperate with flanges 120 and 122 which extend inwardly toward each other from the distal ends of the legs 110 and 112.

As best described by reference to FIGURE 4, the closure 92 cooperates with the base 72 to clamp the carrier 10 in position by pivoting about the pins 94 to bring it down over the carrier 10. Simultaneously, the closure 92 is moved forwardly towards the end of base 72 opposite from the pins 94 to the limit of the slots 96 and 98. This permits the flanges 120 and 122 on legs 110 and 112 to move past the projections 114 and 116. Thereafter, the closure 92 is forced to move backwardly in a longitudinal direction by an amount limited by the length of slots 96. Simultaneously, the flanges 120 and 122 ride over the shoulders 118 and therefore hold the closure 92 in abutment with the carrier 10. Closure 92 includes a pair of elongated projections 124 and 126 which in the closed position abut the bottom surface of base 12 of the carrier 10 and hold it in position.

If desired, the base 72 of socket 70 may be made of a plastic material, the closure 92 of metal and the contacts 84 of a resilient conductive material.

The present invention may be embodied in other specific forms without departing from the spirit or essential attributes thereof and, accordingly, reference should be made to the appended claims, rather than to the foregoing specification as indicating the scope of the invention.

We claim:

1. A carrier for an integrated circuit comprising a base, an opening in said base to receive said integrated circuit, outstanding walls extending from said base to define a plurality of grooves, said grooves being positioned to receive leads of an integrated circuit, and resilient retention means integral with said carrier for retaining an integral circuit therein and extending into said opening, said retention means including resilient means for biasing engagement means into contact with the integrated circuit body while leaving one surface thereof entirely exposed.

2. A carrier in accordance with claim 1 wherein said retention means includes first and second opposed resilient fingers, and said engagement means are fixed on said fingers.

3. A carrier in accordance with claim 1, said retention means including first and second opposed resilient fingers extending into said opening, supports extending from said fingers for engaging an integrated circuit body on one side thereof, nibs extending from said fingers at positions spaced from said supports whereby said nibs engage opposite walls of an integrated circuit body, said first and second fingers being normally biased toward each other.

4. A carrier for an integrated circuit comprising a base, parallel walls extending from said base to define a plurality of grooves, said grooves being positioned to receive the leads of a flat pack integrated circuit, an opening in said base to receive an integrated circuit body, said grooves defined by said walls being aligned on opposite sides of said opening, resilient retention means integral with said carrier for retaining an integrated circuit thereon, said resilient retention means including a plurality of spaced apart first fingers extending from said walls into said opening, and a plurality of second fingers extending from said walls opposite said first fingers into said opening, said individual first fingers being spaced apart by a distance corresponding to the spacing between said walls, said individual second fingers being spaced apart by a distance corresponding to the spacing between said walls, a first support plate extending laterally from said first fingers adjacent the distal end thereof, a second support plate extending laterally from said second fingers adjacent the distal end thereof, said first and second support plates being positioned for engaging an integrated circuit body on one side thereof, nibs extending from each of said first and second fingers at positions spaced from said support plates whereby said nibs engage opposite walls of an integrated circuit body, said first and second fingers being normally biased toward each other.

5. An integrated circuit carrier in accordance with claim 4 wherein said integrated circuit carrier is mounted in means for connecting the integrated circuit to an active electrical device.

6. A carrier in accordance with claim 5 wherein said means is a socket.

7. An integrated circuit carrier in accordance with claim 4 wherein said first fingers support a plurality of side by side plates, and said second fingers support a plurality of side by side plates.

8. A carrier for an integrated circuit comprising a base, outstanding walls extending from said base to define a plurality of grooves, said grooves being positioned to receive leads of an integrated circuit, an opening in said base to receive an integrated circuit body, and resilient retention means integral with said carrier for retaining an integrated circuit thereon, said retention means including resilient means for biasing engagement means into contact with the integrated circuit body while leaving one surface thereof entirely exposed, said retention means including opposed resilient fingers extending into said opening, said opposed fingers being normally biased toward each other, supports extending into said opening, said supports being positioned to at least partially overlie one side of an integrated circuit body.

9. A carrier in accordance with claim 8 wherein nibs extend from said fingers at positions spaced from said supports whereby said nibs engage opposite walls of an integrated circuit body.

10. A carrier for an integrated circuit comprising a base, an opening in said base to receive an integrated circuit body, outstanding walls extending from said base to define a plurality of grooves, said grooves being positioned to receive leads of an integrated circuit on opposite sides of said opening, and resilient retention means integral with said carrier for retaining an integrated circuit thereon, said retention means including engagement means and resilient means for biasing said engagement means into contact with the integrated circuit body while leaving one surface thereof entirely exposed, said retention means extending into said opening.

11. A carrier for an integrated circuit in accordance with claim 10 including supports extending into said opening, said supports being positioned to overlie at least a portion of only one surface of the body of an integrated circuit.

12. A carrier for an integrated circuit comprising a base, outstanding walls extending from said base to define a plurality of grooves, said grooves being positioned to receive leads of an integrated circuit, an opening in said base to receive an integrated circuit body, and resilient retention means integral with said carrier for retaining an integrated circuit thereon, said resilient retention means including engagement means and resilient means for biasing said engagement means into contact with the integrated circuit body while leaving one surface thereof entirely exposed, said resilient means including opposed fingers extending into said opening, said opposed fingers being normally biased toward each other.

References Cited

UNITED STATES PATENTS

| | | | |
|---|---|---|---|
| 3,311,790 | 3/1967 | Vizzier et al. | 339—174 X |
| 3,335,327 | 8/1967 | Damon et al. | 339—17 X |
| 3,345,541 | 10/1967 | Cobaugh et al. | 339—17 X |
| 3,354,394 | 11/1967 | James | 339—17 X |

MARVIN A. CHAMPION, *Primary Examiner.*

JOHN R. MOSES, *Assistant Examiner.*